United States Patent [19]

Wood et al.

[11] 4,391,595
[45] Jul. 5, 1983

[54] VARIABLE SPEED, MULTIPLE COMPONENT PULLEY

[75] Inventors: Thomas D. Wood; Garry K. Reiss, both of Mt. Vernon; Larry L. Overly, Fredericktown, all of Ohio

[73] Assignee: The J. B. Foote Foundry Co., Fredericktown, Ohio

[21] Appl. No.: 350,002

[22] Filed: Feb. 18, 1982

[51] Int. Cl.³ ............................................. F16H 55/52
[52] U.S. Cl. ..................................................... 474/33
[58] Field of Search ......................... 474/33, 34, 32, 35

[56] References Cited

U.S. PATENT DOCUMENTS

| | | | |
|---|---|---|---|
| 2,208,430 | 1/1939 | Ostler | 474/33 X |
| 2,255,567 | 9/1941 | McElroy | 474/34 X |
| 2,546,856 | 3/1951 | Frazier | 474/33 X |
| 2,594,663 | 4/1952 | Lindell | 474/33 X |
| 2,595,203 | 4/1952 | Reeves | 474/33 |
| 2,741,135 | 9/1956 | Numan | 474/33 |

FOREIGN PATENT DOCUMENTS 109993 8/1960 Pakistan ................................ 474/33

*Primary Examiner*—Lawrence J. Staab
*Assistant Examiner*—Michael D. Bednarek
*Attorney, Agent, or Firm*—Allen D. Gutchess, Jr.

[57] ABSTRACT

A variable speed pulley or sheave with a broad speed range is provided. The variable speed pulley comprises three inter-nesting components which enable a broad range of ratios to be achieved. The multiple component pulley is mounted on an idler shaft with one V-belt connected to a pulley of a drive shaft and another V-belt connected with a pulley of a driven shaft. The pulley includes two outer pulley components which are designed with generally radially-extending tines and recessed hubs. The pulley has a third, intermediate pulley component also mounted on the idler shaft between the outer two components and being slidable thereon to inter-nest with the outer two components. The intermediate component has generally-radially extending, generally triangularly shaped tines which can extend into slots between the tines of the outer two components. The intermediate component also has a hub which can extend into recesses of the outer two pulley components when moved into inter-nesting relationship therewith. The multiple component pulley is particularly effective for use with self-propelled lawn mowers but also has many other applications.

16 Claims, 4 Drawing Figures

VARIABLE SPEED, MULTIPLE COMPONENT PULLEY

This invention relates to a variable speed pulley having at least two outer and an intermediate pulley components which can inter-nest to provide a wide power or speed range of ratios between drive and driven shafts.

The variable speed pulley or sheave has three separate pulley members or components which are mounted on an intermediate or idler shaft and connected with pulleys or sheaves on a drive shaft and a driven shaft through V-belts or the like. The three pulley components are designed to be inter-nesting so that they can be moved toward and away from one another to a greater extent and thereby more widely vary the effective diameters of the pulley components which are engaged by the V-belts. This enables a greater ratio of maximum to minimum diameters to be achieved and, consequently, a greater range of power and speeds.

The two outer pulley components are located in spaced relationship on the idler shaft and face one another. The third, intermediate pulley component is mounted for longitudinal movement on the idler shaft and, preferably, can rotate relative to the shaft but inter-nest in all positions with the outer two components. These outer components have shallow, truncated conical portions which have tines with slots therebetween, with the tines having generally radially-extending fingers and upright fingers at the inner ends extending away from the other pulley component and being affixed to central hubs, the latter fingers also forming grooves around the central hubs. The tines can also have extensions on the upright fingers extending toward the other outer pulley component.

The third, intermediate component of the pulley has a shallow, truncated conical portion extending in opposite directions toward both of the two outer components. The conical portion has an outer rim and a plurality of generally radially-extending, generally triangularly-shaped tines extending from the rim to a central hub of the third component, with the tines also forming grooves on the outer portion of the hub. These grooves can receive the upright fingers and the extensions of the tines of the outer pulley components, and the outer edges of the triangularly-shaped tines can be received in the grooves on the hubs of the outer components when in nesting relationship. For all positions of the third pulley component, the triangular tines are also in engagement with at least the tine extensions of one outer component so that all three pulley components will rotate together on the outer shaft. However, the three components can be mounted for non-rotatable relationship on the shaft, in which instance the constant inter-nesting engagement between the intermediate component and both of the outer components is not necessary.

It is, therefore, a principal object of the invention to provide a variable-speed, multiple-component pulley having at least three inter-nesting pulley components which achieve a greater variable speed range than heretofore possible with variable speed pulleys.

Another object of the invention is to provide a variable-speed, multiple-component pulley having pulley components with inter-nesting tines and recessed hubs which enable the components to inter-nest more fully than with previous designs.

A further object of the invention is to provide a variable speed, multiple component pulley having two outer pulley components and an intermediate pulley component with generally triangularly-shaped tines which engage both outer pulley components for all positions of the intermediate component.

Many other objects and advantages of the invention will be apparent from the following detailed description of a preferred embodiment thereof, reference being made to the accompanying drawings, in which.

Figure 1:
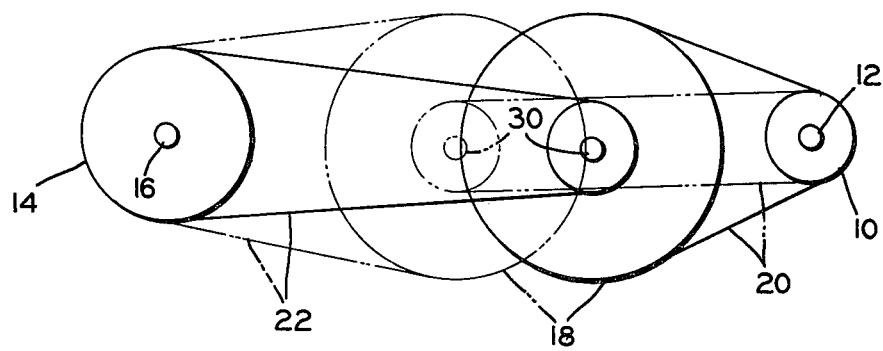
FIG. 1 is a diagrammatic view of a drive shaft and pulley, a driven shaft and pulley, and an idler shaft and an intermediate, multiple-component pulley in accordance with the invention, shown in two positions.

Referring now to FIG. 1, an environment is shown in which a variable speed, multiple component pulley in accordance with the invention is used. A drive pulley or sheave 10 is mounted on a drive shaft 12 and a driven pulley or sheave 14 is mounted on a driven shaft 16. A variable speed pulley indicated at 18, in accordance with the invention, is connected with the drive pulley 10 through a V-belt 20 and is connected with the driven pulley 14 through a V-belt 22.

The variable-speed, multiple-component pulley or sheave 18 includes a first, outer pulley member or component 24, a second, outer pulley member or component 26, and a third, intermediate pulley member or component 28, all of which are mounted on an idler shaft 30. The idler shaft 30 must be mounted in a position parallel to the shafts 12 and 16 and for movement toward and away from the drive shaft 12 and the driven shaft 16 as the intermediate pulley component 28 is moved toward and away from the outer pulley components 24 and 26 and the effective diameters of the pulley 18 vary. By way of example, this can be accomplished by mounting one end of the idler shaft 30 in a bearing 32 located in a slide carrier 34 which is slidably supported in a slide 36 extending toward the shafts 12 and 16. The idler shaft 30 can be suitably mounted by other arrangements, such as a bifurcated pivotable arm supported for pivotable movement in a plane perpendicular to the two shafts 12 and 16 and located therebetween. Suitable means can then be connected to the carrier 34 or the arm to move the idler shaft to change the ratio of the pulley 18.

The outer pulley components 24 and 26 are rotatably mounted on the idler shaft 30 by bushings 38. Inner snap rings 40 and outer snap rings 42 limit longitudinal movement of the outer pulley components on the shaft, with thrust bearings 44 being located between these pulley components and the outer snap rings 42. The outer components are identical, in this instance, and each basically include a shallow truncated conical portion 46 and a central hub portion 48 extending away from the conical portion on the concave side and also away from the other outer pulley component. The conical portion 46 has an outer, solid rim 50 with a circular periphery and a plurality of tines 52 extending radially inwardly from the rim 50 toward to the hub portion 48. The tines 52 can be of generally L-shaped or check-shaped configuration and include fingers 54 extending inwardly from the rim and narrowing in width in an inward direction. The fingers 54 form generally radially-extending slots 56 therebetween in the conical portion 46, which slots also narrow in width in the inward direction. The fingers 54 are preferably equally spaced around the conical portion 46 and are narrower than the slots 56. The tines 52 also include upright fingers 58 extending outwardly on the concave side of the conical portion 46 to an outer edge of a recessed solid hub 60 of the hub portion 48. The upright fingers 58 form grooves 62 therebetween around the outer surface of the hub 60 and slots 64 inwardly thereof which communicate with the inner ends of the radially-extending slots 56. The upright fingers 58 are preferably equally spaced around the periphery of the hub 60 and are narrower than the grooves 62 and the slots 64. The solid hub 60 has an outer, generally planar, annular surface 66 and an inner, generally planar, annular surface 68 between which the bushing 38 extends and through which the idler shaft 30 extends. Each of the outer pulley components also can have additional, upright finger extensions 70 which extend inwardly from the inner ends of the upright fingers 58 and the radially-extending fingers 54 toward the other outer pulley component. The extensions 70 form slots or openings 72 therebetween which communicate with the inner ends of the slots 56 and the slots 64.

The third, intermediate pulley component 28 basically includes a conical portion 74 and a central hub portion 76. The conical portion 74 has a circular, solid rim 78 of generally triangular shape in transverse cross section with a plurality of tines 80 extending from the inner edge of the rim 78 to the hub portion 76. The tines are preferably of generally triangular shaped configuration but whatever the shape, the tines 80 are always much wider at the inner or base end than at the outer end. The tines narrow in width in an inward direction, as viewed from the edges, and form generally radially-extending slots 82 therebetween which also narrow in width in an inward direction, the tines preferably being equally spaced around the conical portion 74 and narrower than the slots 82. The generally triangularly-shaped tines 80 have inwardly-extending narrow ends 84 at their bases which extend to the outer periphery of a recessed, solid hub 86 of the hub portion 76 and form grooves 88 on the periphery of the hub. The hub 86 has a thickness which is substantially less than the width of the bases of the triangular tines 80 so that the tines 80 can fully inter-nest with the outer pulley components 26 and 28 when the intermediate pulley component 28 is moved into nesting relationship with them, faces 90 of the recessed hub 86 then being adjacent the inner faces 68 of the recessed hubs 60.

Figure 2:
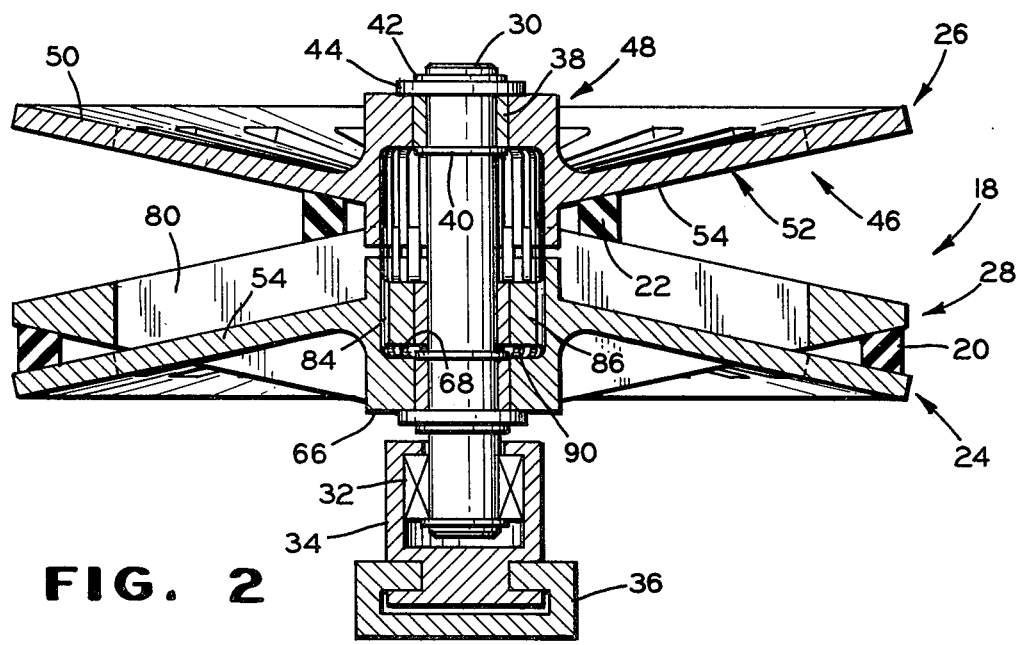
FIG. 2 is an enlarged view in cross section taken through the variable-speed, multiple-component pulley in accordance with the invention.
Figure 3:
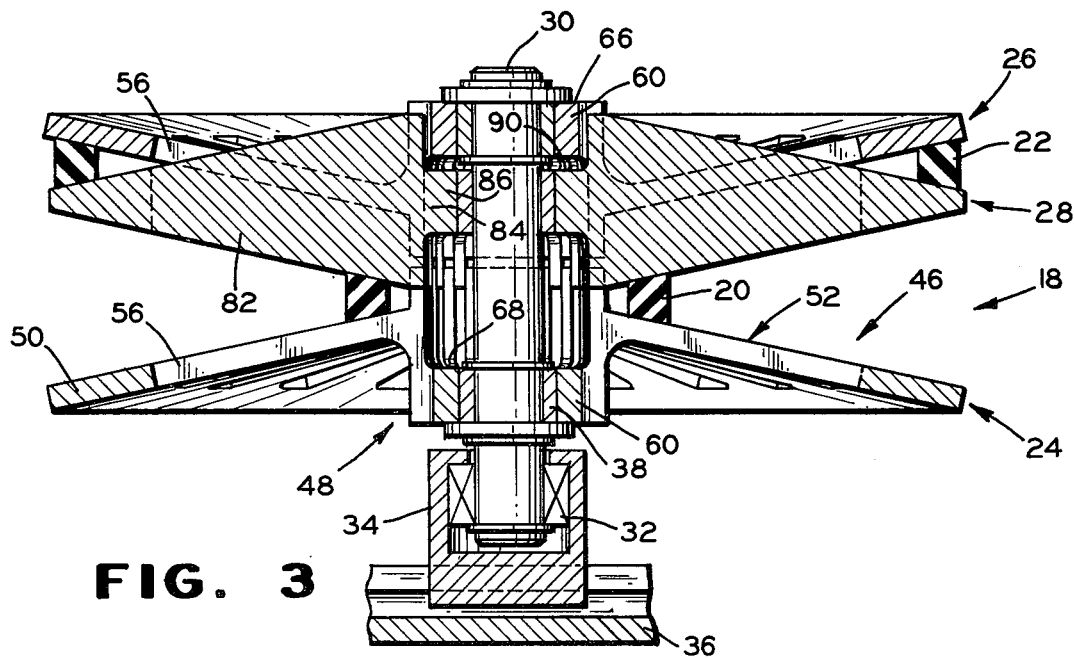
FIG. 3 is a view in cross section of the variable-speed, multiple-component pulley taken along a different line, and with an intermediate pulley component shown in a different position.
Figure 4:
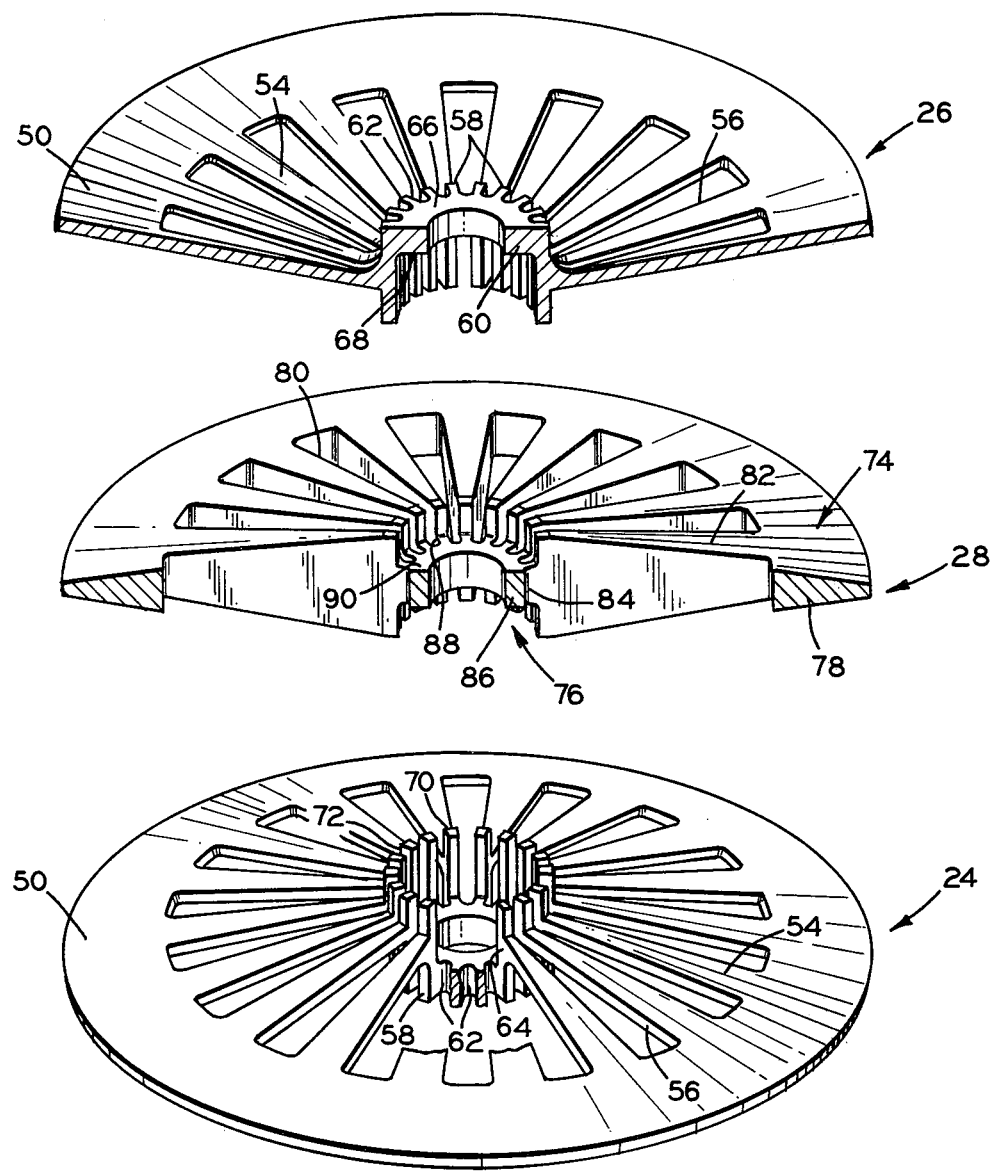
FIG. 4 is an exploded, fragmentary view in perspective, with parts broken away and of parts in cross section, of the three pulley components of the variable speed pulley.

In the fully inter-nesting position of the component 28 with the components 24 and 26, the bases of the triangular tines 80 extend almost to the outer annular surfaces 66 at the hubs 60, as shown in FIGS. 2 and 3, with the tines 80 also extending through the slots or openings 64 and substantially through the grooves 62 between the fingers 58. At the same time, the opposite edges of the tines 80 still extend into the openings 72 between the finger extensions 70 of the opposite one of the outer pulley components. With this arrangement, then, the intermediate pulley component 28 is always in engagement with both of the outer pulley components 24 and 26 to assure that all three components will rotate together. The tine extensions 70 could be eliminated if all three of these components were mounted for non-rotatable relationship on the idler shaft 30, as by using a common key on the shaft for all three components. However, with such non-rotatable mountings, the intermediate component 28 can tend to bind more easily when sliding along the idler shaft between the outer components.

While the three shafts 12, 16, and 30 are shown as vertical, they could also be horizontal or at any angles therebetween. It is only important that the shafts are parallel to one another and that the pulleys are in parallel planes, along with the V-belts 20 and 22.

Various modifications of the above described embodiments of the invention will be apparent to those skilled in the art, and it is to be understood that such modifications can be made without departing from the scope of the invention, if they are within the spirit and the tenor of the accompanying claims.

We claim:

1. A variable speed pulley to be mounted on a shaft, said pulley comprising a first, outer pulley component and a second, outer pulley component, each of said pulley components having a shallow truncated conical portion and a central hub portion extending outwardly from the concave side of said conical portion, said conical portion having an outer rim land a plurality of generally radially-extending, generally L-shaped tines extending from said rim to said hub portion, said tines forming generally radially-extending slots therebetween in said conical portion and forming grooves therebetween on said hub portion, said slots and said grooves being wider than corresponding portions of said tines, said hub portions having central bores for receiving the shaft, said pulley comprising a third, intermediate pulley component having a shallow truncated conical portion extending in opposite directions and a central hub portion, said conical portion of said third component having an outer rim and a plurality of generally radially-extending, generally triangularly-shaped tines extending from said rim of said third component to said hub portion of said third component, said triangularly-shaped tines forming generally radially-extending slots therebetween in said conical portion of said third component and forming grooves therebetween on said hub portion of said third component, said slots and said grooves of said third component being wider than the corresponding portions of said triangularly-shaped tines, said hub portion of said third component having a central bore for receiving the shaft, and said triangularly-shaped tines being received in the radially-extending slots and the hub grooves of one of said outer components with edge portions of said triangularly-shaped tines extending near the outer extremity of said one outer component hub portion when said intermediate component and said one outer component are in fully internesting relationship.

2. A variable speed pulley according to claim 1 characterized by said grooves on said hub portion of said third component being formed by ends of said triangularly-shaped tines extending inwardly from the bases of said triangularly-shaped tines.

3. A variable speed pulley according to claim 2 characterized by said hub portion of said third component and said ends of said triangularly-shaped tines being substantially shorter than the lengths of the bases of said triangularly-shaped tines.

4. A variable speed pulley according to claim 2 characterized by edge portions of said bases of said triangularly-shaped tines on each side of said ends being received in the grooves of the hub portions of said first and second components when fully inter-nesting.

5. A variable speed pulley according to claim 1 characterized by both of said outer components having extensions on the tines extending toward the other outer pulley component with said triangularly-shaped tines cooperating with said extensions to cause the three pulley components to rotate together for all positions of said third pulley component, said third pulley component being rotatable and slidable on the shaft.

6. A variable speed pulley comprising a first, outer pulley component, a second, outer pulley component, and a third intermediate pulley component, a shaft extending through said pulley components with said third pulley component being slidably mounted on said shaft between said outer pulley components, each of said outer pulley components having a truncated conical portion and a central hub portion extending outwardly away from the other outer component, each of said conical portions having an outer rim and a plurality of generally radially-extending tines extending from said rim to said hub portion, said tines forming generally radially-extending slots therebetween in said conical portion and forming grooves therebetween on said hub portion, said hub portion having a central bore receiving the shaft and forming a central recess facing inwardly toward the other outer pulley component, said third pulley component having a shallow truncated conical portion extending in opposite directions and a central hub portion, said hub portion of said third component having a central bore receiving the shaft, said conical portion of said third component having an outer rim and a plurality of generally radially-extending tines extending from said rim of said third component to said hub portion of said third component, said tines and said hub portion of said third component forming central recesses on both sides of said third component and facing toward said central recesses of said outer pulley components, said tines of said third component forming generally-radially-extending slots therebetween in said conical portion of said third component and forming grooves therebetween on said hub portion of said third component, said slots and said grooves of said outer components being wider than corresponding portions of said radially-extending tines of said third component, said tines of said third component being received in said slots and said grooves of said outer components and said hub portion of said third component being received in said recesses of said outer components when said third component is moved into fully inter-nesting positions with respect to said outer components.

7. A variable speed pulley according to claim 6 characterized by said tines of said third component being generally triangularly-shaped with the inner ends being wider than the outer ends.

8. A variable speed pulley according to claim 6 characterized by the width of the bases of said triangularly-shaped tines and the thickness of the hub portion of said third component being such that the outer edge portions of the bases of said triangularly-shaped tines extend substantially to the outer ends of said hub portions of said outer pulley components when said third component is moved into fully inter-nesting positions with said outer pulley components.

9. A variable speed pulley according to claim 6 characterized by said tines of said outer pulley components forming spaced extensions extending toward said third pulley component with said tines of said third component engaging said extensions for all positions of said third component.

10. A variable speed pulley comprising a shaft, a first outer pulley component rotatably mounted on said shaft in a substantially fixed position axially of said shaft, a second, outer pulley component rotatably mounted on said shaft in spaced relationship with respect to said first component and in a substantially fixed position axially of said shaft, and a third, intermediate pulley component mounted on said shaft between said outer pulley components, said third pulley component being slidably and rotatably mounted on said shaft between said outer pulley components, each of said outer pulley components having a truncated, conical portion and a central hub portion extending outwardly away from the other outer component, each of said conical portions having an outer rim and a plurality of generally radially-extending tines extending from said rim to said hub portion, said tines forming generally radially-extending slots therebetween in said conical portion and having extensions extending in spaced relationship toward the other outer pulley component, said third pulley component having a shallow truncated conical portion extending in opposite directions and a central hub portion, said conical portion of said third component having an outer rim and a plurality of generally radially-extending tines extending from said rim of said third component to said central hub portion of said third component, said tines of said third component forming generally radially-extending slots therebetween in said conical portion of said third component, said slots of said outer components being wider than corresponding portions of said radially-extending tines of said third component, said tines of said third component being received in said slots of said outer components when said third component is moved into fully inter-nesting positions with respect to said outer components, and said tines of said third component cooperating with said extensions of said outer components to cause said three components to rotate together for all positions of said third component on said shaft.

11. A variable speed pulley according to claim 10 characterized by said tines of said outer components being generally L-shaped and forming recesses with said hub portions of said outer components facing toward said third pulley component, the depth of each of said recesses exceeding the thickness of the central hub portion of said third component.

12. A variable speed pulley according to claim 10 characterized by said tines of said outer components also forming grooves on said hub portions of said outer components with said grooves receiving said tines of said third component when said third component is moved into fully inter-nesting positions with respect to said outer components.

13. A variable speed pulley according to claim 10 characterized by said radially-extending tines of said third component having ends forming grooves therebetween on said hub portion of said third component with said grooves receiving said radially-extending tines of said outer components when said third component is moved into fully inter-nesting positions with respect to said outer components.

14. A variable speed pulley according to claim 13 characterized by said hub portion of said third component and said ends of said tines of said third component being substantially shorter than the width of the bases of said tines of said third component.

15. A variable speed pulley according to claim 14 characterized by the width of the bases of said tines of said third component and the thickness of the hub portion of said third component being such that the outer edge portions of the bases of said tines of said third component extend substantially to the outer ends of said hub portions of said outer pulley components when said third component is moved into fully inter-nesting positions with respect to said outer pulley components.

16. A variable speed pulley according to claim 10 characterized by said tines and said hub portions of said outer components forming recesses facing toward said third component and said tines and said hub portion of said third component forming recesses facing toward both of said outer components, said hub portion of said third component having a solid hub which is at least partially received in said recesses of said outer pulley components when said third component is moved into fully inter-nesting positions with respect to said outer pulley components.

* * * * *